2,923,725

REMOVAL OF ORGANOMETALLIC HALIDES FROM ORGANOMETALS

Gene Nowlin, Glen Burnie, Md., and Harold D. Lyons, Bartlesville, Okla., assignors to Phillips Petroleum Company, a corporation of Delaware No Drawing. Application October 10, 1955
Serial No. 539,662

16 Claims. (Cl. 260—448)

This invention relates to the preparation of organometallic compounds. In one aspect, this invention relates to the removal of organometallic halides from organometals.

Organo compounds of the metals aluminum, beryllium, gallium, indium and thallium are very useful as components of catalyst systems employed in the polymerization of monoolefins. The general formula for these compounds is $MR_x$, wherein M is one of the aforementioned metals, R is an alkyl radical, a cycloalkyl radical, an aryl radical, or mixtures of these radicals, and $x$ is equal to the valence of the metal, i.e., 2 or 3. Examples of these compounds corresponding to the formula $MR_x$ which may be used in various catalysts systems are $Al(C_2H_5)_3$, $Al(C_3H_7)_3$, $Al(C_4H_9)_3$, $Al(C_6H_5)_3$, $Al(CH_3)_3$, $Be(CH_3)_2$, $Ga(C_3H_7)_3$, $In(CH_3)_3$, $Be(C_6H_5)_2$, $Al(C_6H_{13})_3$, $Al(C_{12}H_{25})_3$, $Ga(C_6H_5)_3$, $In(C_6H_5)_3$, $Tl(C_2H_5)_3$, $Tl(CH_3)_2$, $Al(C_6H_4 \cdot CH_3)_3$ and the like.

The above described organometals can be obtained in high yield by the action of an alkali metal, such as sodium or potassium, on an organometallic halide or a mixture of organometallic halides. For example, high yields of triethylaluminum and other trialkyl-, tricycloalkyl- and triarylaluminum compounds can be obtained by the action of sodium on an organoaluminum halide or a mixture of organoaluminum halides, such as diethylaluminum chloride and ethylaluminum dichloride. This is particularly the case when the alkali metal is employed as a finely divided dispersion in an inert solvent. The product generally contains halogen in the form of an organometallic halide. While it is possible to remove the organometallic halide by treatment of the product with an alkali metal followed by distillation, the removal of all the halogen generally cannot be accomplished in one step, but must be repeated and often requires several steps. This method for removal of the organometallic halide is inconvenient as well as time consuming.

It is an object of this invention to provide an improved method for the preparation of organometals.

Another object of the invention is to provide a method for the removal or organometallic halides from organometals.

A further object of the invention is to provide a method for the preparation and purification of triethylaluminum.

Other and further objects and advantages of this invention will become apparent to those skilled in the art upon consideration of the accompanying disclosure.

We have now discovered a novel and efficient method whereby an organometal, such as triethylaluminum, which contains an organometallic halide, such as diethylaluminum chloride and/or ethylaluminum dichloride, can be obtained in pure form. Broadly speaking, the method of this invention comprises treating an impure organometal with a primary, secondary, or tertiary amine and thereafter recovering a halogen-free product from the reaction mixture.

When operating in accordance with the process of this invention, the organometal compound containing one or more organometallic halides is charged to a reaction vessel. The amine is then slowly introduced into the vessel, at least one mol of the amine per mol of organometallic halide being added. It is preferred to use an excess of the amine, and as much as 10 mols of amine per mol of organometallic halide can be employed. It is desirable to provide the reaction vessel with a means of agitation in order to facilitate contact of the reactant materials. The reaction generally takes place at room temperature, i.e., at a temperature between 20 and 30° C., but it is often considered to be desirable to increase the temperature after the addition of the amine in order to increase the rate of the reaction. Accordingly, temperatures as high as 200° C. can be used. The reactants are heated for a period in the range of from 5 minutes to 2 or 3 hours and longer, the time required to complete the reaction depending upon the particular reactants and the temperature of reaction. In some cases it is preferred to reflux the reaction mixture for whatever time is required to effect the reaction.

The reaction can be effected in the presence or absence of a solvent. When a solvent is utilized, it is charged to the reaction vessel either separately or in admixture with the organometal compound. Thereafter the amine is introduced as previously indicated. When the organometal compound is a solid, the use of solvents is particularly advantageous.

Suitable solvents for use in the process of this invention are paraffins, cycloparaffins and/or aromatic hydrocarbons which are relatively inert, non-deleterious and liquid under the conditions of the process. Examples of solvents which can be employed are the octanes, the nonanes, the decanes, the hexadecanes, the heptadecanes, the octadecanes, cyclohexane, methylcyclohexane, benzene, toluene, xylene, and the like. Mixtures of any two or more of the above-listed solvents can also be employed in the process of this invention. Solvents which are preferred are those which have a boiling point above the boiling point of the organometal compound being recovered in order to facilitate separation of the product during distillation. For example, when the compound being purified or separated is triethylaluminum, it is preferred to use a solvent, such as hexadecane, which boils above 195° C. Such a solvent serves as a "chaser" when distilling the triethylaluminum. Ethers, such as ethyl, methyl or propyl ethers and mixtures thereof, can also be used as solvents although they form stable complexes with the organometals and will distill. The products so formed are pure organometal etherates, and when such a compound is the desired product, this method is particularly advantageous.

As stated hereinbefore, primary, secondary, and tertiary amines can be used in the process of this invention. However, it is preferred to utilize secondary and tertiary amines. Examples of suitable amines include methylamine, ethylamine, n-propylamine, isopropylamine, n-butylamine, dimethylamine, diethylamine, methylethylamine, di-n-butylamine, trimethylamine, triethylamine, aniline, N-ethylaniline, N,N-dimethylaniline, pyridine, and the like.

The product which forms when an amine reacts with an organometallic halide is, in many instances, insoluble in the reaction mixture. The formation of a precipitate is dependent, however, upon the concentration and type of reactants. If the amine-organometallic halide complex precipitates, it can be removed by any suitable means such as filtration or centrifugation after which the organometal compound can be distilled. However, it is unnecessary that any of the precipitate which forms be removed from the reaction mixture prior to distillation. Thus, the organometal compound can be distilled from the total reaction mixture, but care must be exercised so that the material does not become superheated in which case the amine complex might be carried overhead. While it is generally preferred to separate the organometal compound from the reaction mixture by distillation, other methods of separation can be used which come within the scope of the invention. When a solvent is not utilized and the amine-organometallic halide complex precipitates, the organometal compound can be recovered by filtration, centrifugation or other well-known method.

The method of this invention is particularly applicable to the separation of trialkyl-, tricycloalkyl- and triarylaluminum compounds from alkyl-, cycloalkyl- and arylaluminum halides. As indicated hereinbefore, however, the invention is in general applicable to the separation of organometal compounds which correspond to the formula $MR_x$. The organometallic halides may be represented by the general formula $R_mMX_n$, wherein R is a hydrocarbon radical and M is a metal as described hereinabove, and X is a halogen such a fluorine, chlorine, bromine or iodine. The $m$ and $n$ are integers and the sum of $m$ and $n$ is equal to the valence of the metal M, i.e., 2 or 3.

A more comprehensive understanding of the invention may be obtained by referring to the following illustrative example, which is not intended, however, to be unduly limitative of the invention.

*Example*

Five grams of triethylaluminum containing 0.51 weight percent chlorine (calculated as 0.00072 gram atoms of chlorine) in the form of ethylaluminum chloride (diethylaluminum chloride and/or ethylaluminum dichloride) was charged to a reactor. Thereafter 0.063 gram (0.0008 mol) of pyridine, which had been distilled from sodium, was slowly added to the reactor. Subsequent to addition of the pyridine, the mixture was refluxed for a period of 15 minutes. A precipitate was formed by the reaction of the pyridine with the ethylaluminum chloride. The triethylaluminum was distilled from the total reaction mixture at a pressure of 5 mm. mercury, care being taken to avoid superheating of the pot in order that the pyridine complex would not be carried overhead.

One cubic centimeter of the distillate was hydrolyzed by the addition of 8 cubic centimeters of n-propyl alcohol. The mixture was diluted with 20 cubic centimeters of distilled water and 2 cubic centimeters of concentrated nitric acid was added. The solution was tested for chloride ion with freshly prepared silver nitrate reagent. No precipitate was formed which showed the absence of chloride ions.

A sample of the starting material (triethylaluminum containing 0.51 weight percent chlorine) was hydrolyzed in the same manner by adding n-propyl alcohol followed by water and nitric acid. The addition of silver nitrate produced a precipitate which showed that chloride ions were present.

It will be apparent to those skilled in the art that variations and modifications of the invention can be made upon study of the foregoing disclosure. Such modifications are believed to be clearly within the spirit and scope of the invention.

We claim:

1. A process for the removal of organometallic halides from organometals, said organometals corresponding to the formula $AlR_3$ and said organometallic halides corresponding to the formula $R_mAlX_n$, wherein R is a member selected from the group consisting of alkyl, cycloalkyl and aryl radicals and said R contains from 1 to 12, inclusive, carbon atoms, X is a halogen, and $m$ and $n$ are integers, the sum of $m$ and $n$ being equal to 3, which comprises adding an amine containing only hydrogen, carbon and nitrogen atoms and free of aliphatic unsaturation, said amine being selected from the group consisting of primary, secondary and tertiary amines, to an organometal corresponding to the formula $AlR_3$, said organometal containing a organometallic halide corresponding to the formula $R_mAlX_n$, at least one mol of said amine being added per mol of said organometallic halide; maintaining conditions such that said amine reacts with said organometallic halide; and separating said organometal from the organometallic halide-amine complex so formed.

2. The process of claim 1 in which said organometal is triethylaluminum and said triethylaluminum contains ethylaluminum chloride.

3. The process of claim 1 in which said organometal is triisopropylaluminum and said triisopropylaluminum contains propylaluminum chloride.

4. The process of claim 1 in which said organometal is triisobutylaluminum and said triisobutylaluminum contains butylaluminum chloride.

5. The process of claim 1 in which said organometal is triisohexylaluminum and said triisohexylaluminum contains hexylaluminum chloride.

6. The process of claim 1 in which said organometal is tridodecylaluminum and said tridodecylaluminum contains dodecylaluminum chloride.

7. The process of claim 1 in which said amine is pyridine.

8. The process of claim 1 in which said amine is dimethylamine.

9. The process of claim 1 in which said amine is diethylamine.

10. The process of claim 1 in which said amine is trimethylamine.

11. The process of claim 1 in which said amine is n-propylamine.

12. A process for the removal of organometallic halides from organometals, said organometals corresponding to the formula $AlR_3$ and said organometallic halides corresponding to the formula $R_mAlX_n$, wherein R is a member selected from the group consisting of alkyl, cycloalkyl and aryl radicals and said R contains from 1 to 12, inclusive, carbon atoms, X is a halogen, and $m$ and $n$ are integers, the sum of $m$ and $n$ being equal to 3, which comprises introducing an organometal corresponding to the formula $AlR_3$ into a reaction zone, said organometal containing an organometallic halide corresponding to the formula $R_mAlX_n$; adding to said reaction zone at least one mol of an amine per mol of said organometallic halide, said amine containing only hydrogen, carbon and nitrogen atoms and being free of aliphatic unsaturation and said amine being selected from the group consisting of primary, secondary and tertiary amines; maintaining in said reaction zone conditions such that said amine reacts with said organometallic halide; and separating by distillation said organometal in pure form from the organometallic halide-amine complex so formed in said reaction zone.

13. The process of claim 12 in which said organometal is introduced into said reaction zone in admixture with a solvent, said solvent having a boiling point above that of said organometal.

14. The process of claim 13 in which said organometal is triethylaluminum and contains ethylaluminum chloride, and said solvent is hexadecane.

15. The process of claim 13 in which said solvent is an ether and an organometal etherate is recovered as the product of the process.

16. The process of claim 12 in which the reaction mixture contained in said reaction zone is maintained at a temperature between 20 and 200° C. for a period in the range of 5 minutes to 3 hours.

References Cited in the file of this patent

Sidgwick: Vol. 1, The Chemical Elements and Their Compounds, p. 417 (1950), Oxford University Press.